United States Patent [19]

Yapoujian

[11] Patent Number: 4,707,762

[45] Date of Patent: Nov. 17, 1987

[54] SURGE PROTECTION DEVICE FOR GAS TUBE

[75] Inventor: Nerses N. Yapoujian, 2705 W. Arthur Ave., Chicago, Ill. 60645

[73] Assignee: Nerses Nick Yapoujian, Chicago, Ill.

[21] Appl. No.: 862,707

[22] Filed: May 13, 1986

[51] Int. Cl.$^{4}$ .......................... H01T 4/10; H02H 9/04; H02H 3/22

[52] U.S. Cl. .................................... 361/124; 361/118; 361/120; 361/130; 313/231.11

[58] Field of Search .................. 313/231.11, 231.11 X, 313/231.21, 325; 361/124, 126, 125, 127, 130, 120, 119, 118, 117, 128, 129

[56] References Cited

U.S. PATENT DOCUMENTS

| | | | |
|---|---|---|---|
| 3,755,715 | 8/1973 | Klayum | 361/124 X |
| 3,896,343 | 7/1975 | Baker | 313/231.11 X |
| 3,898,533 | 8/1975 | Scudner | 361/126 X |
| 4,062,054 | 12/1977 | Simokat | 361/119 |
| 4,132,915 | 1/1979 | Wilms | 313/325 |
| 4,249,224 | 2/1981 | Baumbach | 361/124 |
| 4,405,967 | 9/1983 | Cwirzen | 361/124 |
| 4,603,368 | 7/1986 | Pagliuca | 361/119 |

*Primary Examiner*—M. H. Paschall

*Assistant Examiner*—H. L. Williams

[57] ABSTRACT

A surge protection device which provides multiple back-up and tends to fail closed circuit or shorted is disclosed. The primary surge protection is provided by a gas break-down tube set to operate at one voltage level. A secondary or back-up surge protection is provided to operate at a higher voltage by means of a flat ceramic member sandwiched between the top of the tube and a cap that is affixed over the tube and ceramic member. The cap is sealed to the tube and the spacer end encloses a volume of air which is thus protected from moisture and dust. Upon failure of the gas tube, the back-up unit shorts surges across the shortest path between the cap and tube top, which path is adjacent a dielectric wall formed by the member. Discharge via this path tends to vaporize metal in the enclosed volume which upon redeposit on the ceramic surface tends to permanently short across that surface so that the device tends to fail closed circuit. In a second embodiment, the ceramic wall is formed in a stairstep arrangement of a ceramic member having zones of high and relatively low dielectric material. A third, still higher voltage, failsafe discharge air gap is provided in both embodiments, between the cap and a post atop the tube through ambient air.

2 Claims, 7 Drawing Figures

SURGE PROTECTION DEVICE FOR GAS TUBE

FIELD OF THE INVENTION

The present invention is directed to improvements in electrical surge protection devices and especially in improvements for the back-up or secondary protection for a gas tube type surge protection device.

BACKGROUND OF THE INVENTION

The protection of electrical equipment and lines from overloads and especially from electrical surges has a long history. Because of the extent and expense of their lines, the telephone industry has led the way in this technology. A more or less standard lighting arrester housing is shown in U.S. Pat. No. 2,792,471, which also discloses an air gap surge protection unit.

With the change over from electro-mechanical equipment to transistorized and integrated circuit equipment, the need for overload or surge protection has increased. In most cases today, a "gas tube" protector is employed. See, for example, U.S. Pat. No. 4,208,694 to Gilberts.

Gas-filled protectors consist of two or more electrodes sealed in a hermetic enclosure, which is filled with an inert gas at low pressure. If the device is not sealed completely or has microcracks, the protector can have a slow air leak, which will not be rejected even by manufacturers' 100% quality control testing. Eventually, however, the transient breakdown voltage of the protector, which is of great importance, can be increased 400%-500% because of air leakage.

Because of this problem, the industry has gone to the provision of back-up or secondary path discharge (usually air gap) mechanisms. See, for example, U.S. Pat. No. 4,132,915. Often these devices include milar or plastic insulators which define a secondary or back-up air gap. Often, however, these plastics melt and cover the discharge area of back-up mechanisms which causes the pulse breakdown voltage to be higher than expected.

See the article "Test Those Protectors!" by Nerses Nick Yapoujian, the present inventor, which appeared in the Nov. 1, 1983 issue of "Telephone Engineer and Management". Also, articles "Gas Discharge Systems Furnish Circuit Protection", published in "EDN", June 27, 1985, and "Surge Protector Must Be Fast-action and Fail-safe", published in "Electronic Design", Nov. 21, 1985, also written by Nerses Nick Yapoujian.

It should be noted that failure of the protection device in a manner so as to be open circuited or as high resistance results in possible damage to the equipment to be protected. It is, therefore, highly desirable for a protection device to fail short or closed circuit.

Other patents of interest are:

| U.S. Pat. No. | Patentee | Issued |
|---|---|---|
| 2,792,471 | D. L. Baxter et al. | 05/14/1957 |
| 3,522,570 | O. Wanaselja | 08/04/1970 |
| 3,543,207 | C. J. Kawieck | 11/24/1970 |
| 3,813,296 | D. D. McStrack et al. | 05/28/1974 |
| 3,968,303 | R. C. Harris | 07/06/1976 |
| 4,158,869 | A. Gilberts | 06/19/1979 |
| 4,208,694 | A. Gilberts | 06/17/1980 |
| 4,241,374 | A. Gilberts | 12/23/1980 |
| 4,314,304 | B. Baumbach | 02/02/1982 |
| 4,317,155 | M. Harada et al. | 02/23/1982 |
| 4,404,234 | P. Zuk | 09/13/1983 |
| 4,407,849 | Laird K. S. Hass et al. | 10/04/1983 |
| 4,410,124 | F. Buechel | 10/18/1983 |
| 4,463,403 | M. Fasano | 07/31/1984 |

-continued

Other patents of possible interest are: U.S. Pat. Nos. 3,569,786, issued to T. Kunugi, on 3/10/1971; 3,813,577, issued on 5/28/1974; 3,818,271, issued to B. Baumbach, on 06/18/1974; 3,849,750, issued to B. Baumbach, on 11/19/1974; 3,886,411, issued to M. Klayum, on 05/27/1975; 3,975,664, issued to B. Baumbach, on 08/17/1976; 4,002,952, issued to G. Menninga, on 01/11/1977; 4,013,927, issued to A. Gilberts, on 03/22/1977; 4,128,855, issued to A. Gilberts, on 12/05/1978; 4,132,915, issued to M. Wilms, on 01/02/1979; 4,168,515, issued to B. Baumbach, on 09/18/1979; 4,314,302, issued to B. Baumbach, on 02/02/1982; 4,320,435, issued to R. Jones, on 03/16/1982; 4,321,650, issued to P. DeLuca, on 03/23/1982; 4,321,649, issued to A. Gilberts, on 03/23/1982; 4,325,100, issued to B. Baumbach, on 04/13/1982; 4,351,015, issued to T. Smith, on 09/21/1982; 4,394,704, issued to R. Jones, on 07/19/1983; 4,405,967, issued to C. Cwirzen, on 09/20/1983.

SUMMARY OF THE INVENTION

To overcome one or more drawbacks of the prior art and to provide a surge protection device that is reliable and tends to fail in a short circuit, a surge protection device constructed in accordance with the present invention includes a gas tube having a primary path electrode and a ground electrode and a novel secondary or back-up mechanism comprising a secondary electrode to be electrically connected in common with the ground electrode, a ceramic separator of high dielectric ceramic defining a ceramic wall, one side of which wall is electrically in common with the first electrode of the gas tube and so arranged that the back-up discharge occurs primarily along the side of the ceramic wall.

A second feature of the invention is to provide a metal coating at the discharge surface which may be vaporized and redeposited to short-circuit the first and secondary electrodes.

The invention, together with the advantages thereof, may best be understood by reference to the following description taken in connection with the accompanying drawings, in the several figures of which like reference numerals identify like elements.

DETAILED DESCRIPTION OF THE PREFERRED EMBODIMENTS

Figure 1:
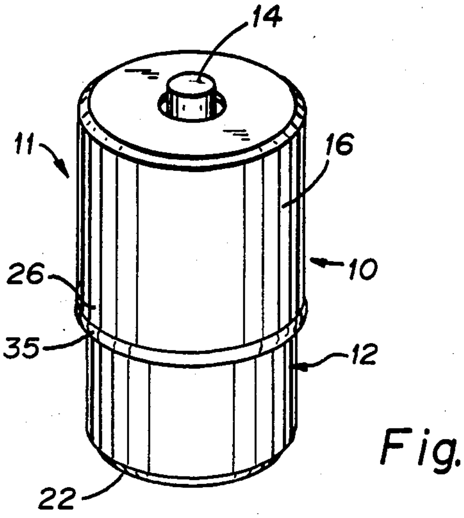
FIG. 1 is a perspective view of a surge protection device constructed in accordance with the present invention.

Referring to FIG. 1, there is depicted a surge protection device constructed in accordance with the present invention and generally designated by the number 10. The device 10 includes a gas tube 12 which is more or less of conventional construction with a post 14 which is to be connected to the telephone line or electrical equipment which is to be protected. In accordance with the present invention, at the top of the device 10 is a cap or can electrode 16, which serves as a secondary electrode for a novel back-up mechanism, generally indicated by the number 11.

Figure 3:
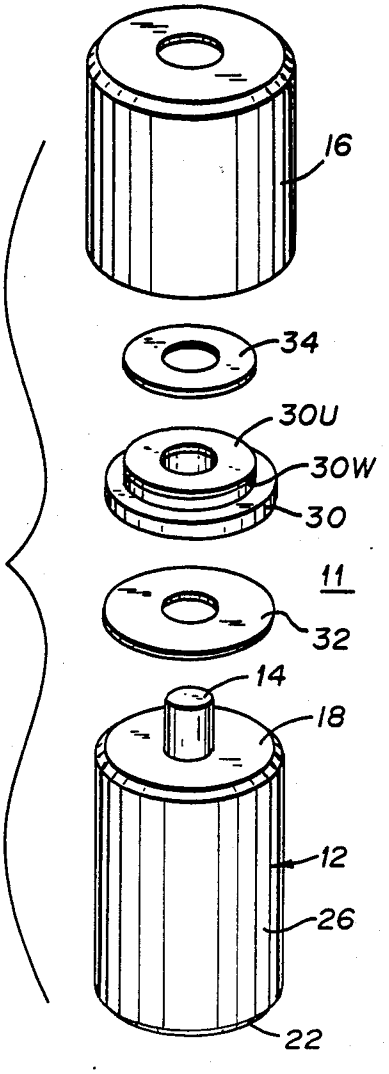
FIG. 3 is an exploded perspective view of the device of FIGS. 1 and 2.
Figure 2:
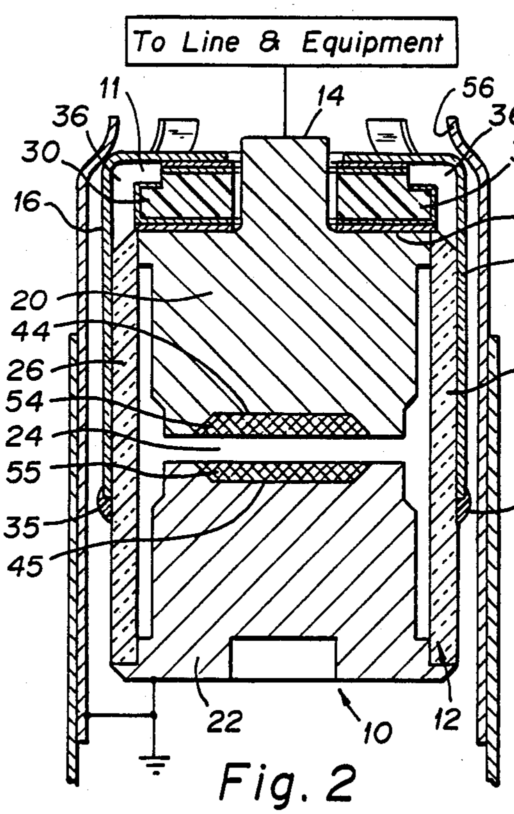
FIG. 2 is a sectional view of the surge protection device of FIG. 1 installed in a standard hardware (partly shown), also in section, with electrical connections shown schematically.

As better seen in FIGS. 2 and 3, the gas tube 12 has a flat upper portion or surface 18 surrounding the post 14 which is preferably formed unitarily of a suitable metal. This unitary piece also serves as a primary discharge electrode 20 for the gas tube 12.

That is, as shown in FIG. 2, this primary electrode 20 is spaced from a second primary electrode 22 by a gap 24 which is enclosed by a cylindrical wall 26 of a suitable insulating material. The volume so enclosed including the gap 24 is filled with a suitable gas. The second electrode 22 is, in use, connected to ground, as shown in FIG. 2. As stated before, the tube 12 is essentially conventional, being modified only tò have a special shape of electrodes 20, 22 and a flat surface 18 for receiving the novel back-up mechanism 11 including the can 16. The electrodes 20, 22 have a circular recess 44, 45, respectively, into which is filled with a coating of aluminum, magnesium metal, and titanium hidride mixed with butyl acetate. Such a coating is conventional, but the provision of a thick layer of it with the recesses 44, 45 is novel and provides extended life.

Figure 4:
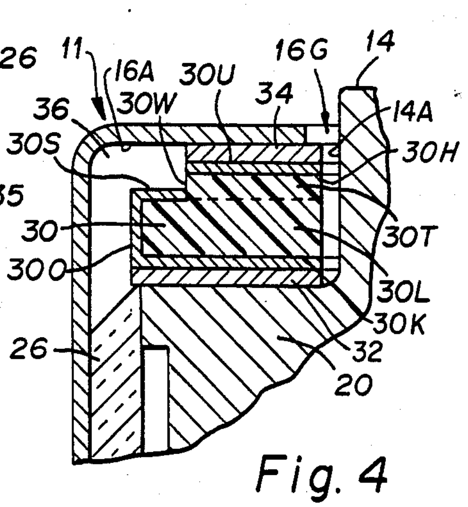
FIG. 4 is an enlarged sectional view of a portion of the device of FIGS. 1-3.

This back-up mechanism 11 includes a ceramic annulus 30 which defines a vertical encircling wall 30W (FIG. 4). The upper surface 30U of the annulus 30 is coated with metal, as is its lower surface 30L, its outer surface 30O, and the shelve surface 30S below the wall 30W. The surfaces 30S, 30O, and 30L are electrically connected in common by the continuity of the coating. However, the surface 30U is electrically isolated from them by the ceramic material and the gap of the wall 30W.

To insure a good electrical contact, a suitable flat brazing ring or washer 32 is sandwiched between the metalized surface 30L and the surface 18 and a second washer 34 between the surface 30U and the bottom surface of the top of the can 16, as best shown in FIG. 4. These are sized to match the size of the bottom and top surfaces 30U and 30L of the member 30. In the assembled device, the brazing rings 32 and 34 are brazed to the adjoining surfaces by baking the entire assembled device in an oven for a period. The metal deposited on the surface 30U is initially deposited slightly spaced back from the wall 30W and the inner opening of the annulus so that it will migrate up to the edges during that baking process.

.The geometry of the device 10 is such that the shortest path or gap between the electrode 20 and those components in electrical contact with it, and thus at the same electrical potential, is directly along the wall 30W. This distance is of the order of 0.003 inch for an overload with a back-up breakdown surge potential of 800 volts.

The cap 16 serves to enclose and seal-in a volume of air, indicated at 36. Back up discharge occurs between the edge of the layer 30U and the surface 30S. As stated before, these are coating layers of metal .(preferably copper laid down by the sputtering process), and discharge into such metal at potentials of 800 volts and higher tends to revaporize the metal and to re-deposit it, after the discharge, about the volume 36, especially on the adjacent wall 30W. This results (after a sufficient discharge) in a short circuit between the electrodes 20, 14 to ground through the cap 16 (FIG. 2).

As mentioned in the aforecited patent to Bazarian, the presence of high dielectric material near the air gap provides an improvement in performance since it creates a pre-ionization level of electrons which facilitates that breakdown, and such breakdown occurs more consistently at the same voltage. The present invention takes full advantage of this, and rather than leading the main path discharge away, as in Bazarian, the present invention has its main discharge path along the surface of wall 30W. This is done by having the shortest distance along that surface. This yields even more consistent results in the voltage level of breakdown.

The ceramic element 30 is a single piece of ceramic material wherein the upper portion 30T adjacent to the wall 30W and metal surface coating 30W is formed of high dielectric material, e.g., of a value of approximately 1600, while the lower portion 30L has lower dielectric value, e.g., 300. This zone or area of high dielectric material is indicated by the different cross hatching in FIGS. 2 and 4.

This element 30 is formed in this manner by the active-passive process currently available from the Kyocera Company, of Shibuya-ku, Japan. It is primarily formed of barium titanate.

The stairstep arrangement provides greater structural resiliency to the wall portion, since the lower section 30L serves as a shock absorber and prevents "flaking" of the brittle ceramic material during assembly and handling.

The element 30 may also be made of horizontal layers of dielectric BL162 made by DuPont, wherein six precut layers of 0.006 inch in thickness can be stacked, compressed by about one ton pressure, to about 50% of the of their uncompressed height and then fired, for example, at 1093 degrees Celcius, for 45 minutes.

The metalized surface can be applied by masking the wall 30W prior to placing it into a sputtering chamber.

The cap 16 is sealed secured to the tube 12 by an encircling band of silver epoxy resin 35 and is also sealed to it by brazing washer 34 and element 30, so as to enclose volume 36.

The enclosure of the volume 36 by the cap 16 keeps the air in the volume more or less consistent and prevents problems of premature breakdowns caused by dust or excessive moisture.

The device 10 is made by assembling the elements shown in FIG. 3 and by baking them in an oven at approximately 260 degrees Celsius for 1.0 hour. The metalized coating on the surfaces in contact with the brazing ring 34 is preferably initially formed somewhat away (e.g., 0.100 inches) from the edges of wall 30 and the interior of the central hole so that it will migrate during the brazing operation to those edges. After removal from the oven and allowing the device 10 to cool in a clean, low humidity atmosphere, the bottom of the cap 16 is sealed, using the epoxy 35.

Figure 6:
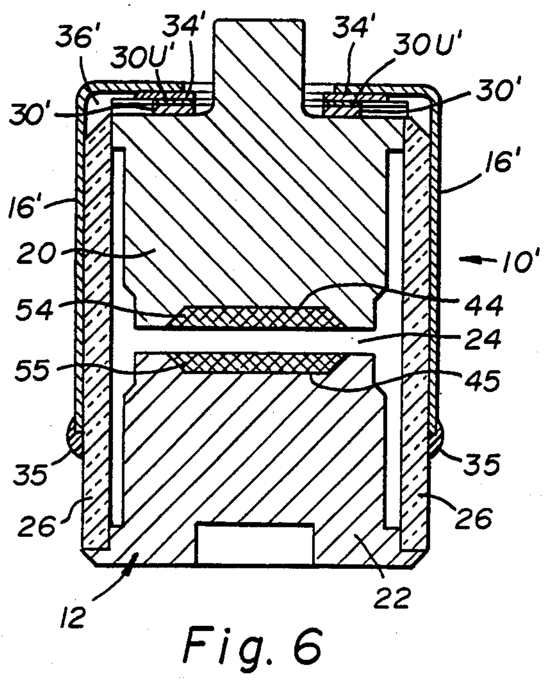
FIG. 6 is a sectional view of the device of FIG. 5, as seen from the line 6—6 of FIG. 7.
Figure 5:
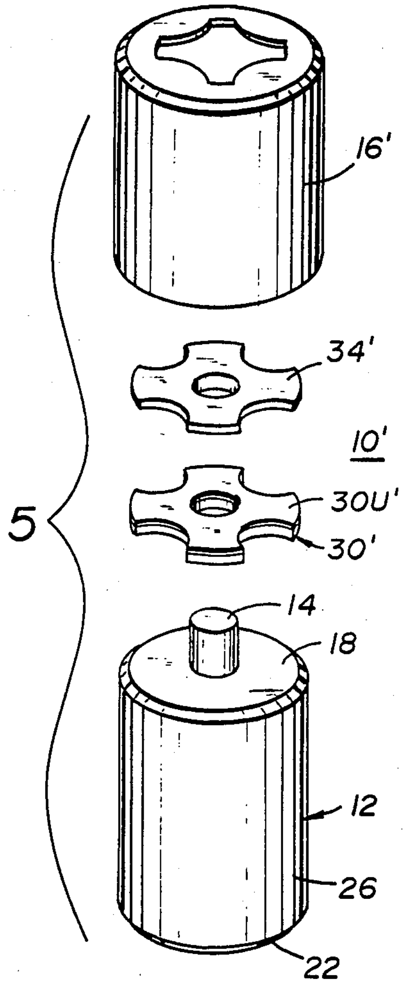
FIG. 5 is an exploded perspective view of a second embodiment of the invention.
Figure 7:
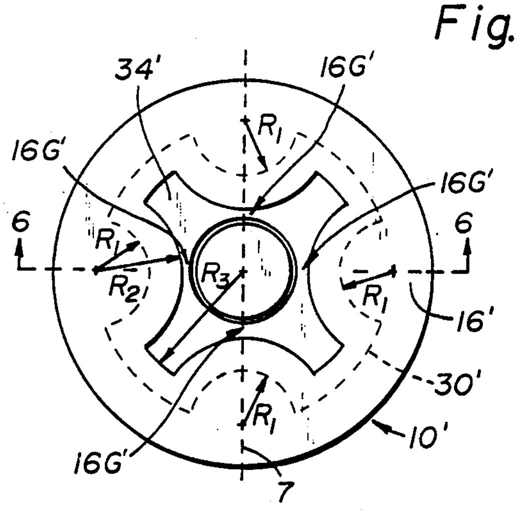
FIG. 7 is a top view of the device of FIGS. 4 and 5 with an interior part shown in phantom outline.

Referring now to FIGS. 5 through 7, there is depicted a second embodiment 10' of the present invention. The tube 12 is identical to that of the prior embodiment, but the cap 16' is formed in an unique manner as is the ceramic annulus or torus 30. In this case, the ceramic torus 30 is thinner and forms its wall 30W' along its entire outside edge. This outer edge is not circular but is a cruciform in outline. This cruciform outer shape of ceramic element 30 is best shown in dashed outlining in FIG. 7 and is that of a large circle with circular cut-outs of radius R1 taken from the four cross points between the large circle and the major axis (line 6—6) and an axis (line 7) at right angle to it, both of which lines pass through the center of the large circle.

In this embodiment, ceramic element 30' is preferably laid down in paste form on the surface 18 and baked in place. A suitable paste may be HI K Dielectric 5217. (Alternatively, it may be formed as shown in FIG. 7 and dropped in place. In this case, a brazing marker like marker 32 should be used.) In either case, it is metalized on its top surface 30U, and a brazing ring 34' (shaped identically in outline) is provided between it and the cap 16'. Again, the cap 16' is sealed by means of epoxy layer 35, to which with the brazing of the cap to the element 30 seals a volume 36 from dust and moisture and provides a more consistent back-up mechanism 11.

The projecting portion 16P of the cap 16 are so positioned, as shown in FIG. 7, as to create a third air gap 16G' between ther post 14 and the cap 16'. This is a back-up discharge path so arranged as to operate should neither the primary gas tube or the secondary back-up 11' not work. For example, a spacing of 0.006 mils. may be provided to have break-down occur at 1500 volts.

A similar third gap 16G is provided between the surface 30V of the first embodiment and the post 14 of tube 12 (FIG.4).

For purposes of illustration and not for limitation, the following dimensions and materials are given. These values may be varied and while they are the presently preferred embodiments, the inventor himself may, in the future, decide to vary from these for different applications, for reasons of economy or as further refinements based upon experience.

| | |
|---|---|
| Tube 12 | Standard two electrodes with ceramic envelope with power gap coating and filled with inert gas |
| Post 14 | 0.095 inch diameter, 0.100 inches high |
| Cap 16 | Brass alloy 260, 0.008 inches thick, overall diameter 0.310 inch; opening diameter 0.107 inch; height .260 inch |
| Brazing Disc 34 | Alloy 90% lead, 10% Indium 0.003 inches thick, overall diameter 0.160 inch; hole diameter 0.107 inch |
| Coating 30 U and other coatings on Disc 30 | .001 inch thick |
| Disc 30 | Overall height .500 inch; wall 30 W, height: 0.003 inch; overall diameter 0.260 inch, diameter at wall 30 W 0.160 inch; hole diameter 0.107 inch |
| Brazing Disc 32 | Alloy 90% lead, 10% Indium, 0.003 inches thick with an overall diameter of 0.260 inch and a hole diameter of 0.107 inch |
| Cap 16' | Same overall size as Cap 16 but with R2 and R3 (FIG. 7) equal to 0.040, 0.050, and 0.075 inches respectively |
| Element 30' | Barium Titanate, overall diameter 0.260 inch; hole diameter 0.107 inch; R1 (FIG. 7) 0.040 inch, thickness 0.003 inches |

-continued

| | |
|---|---|
| Epoxy 35, 35' | Silver Epoxy 4621 |

The device 10' is assembled and made by a process similar to that of the device 10.

While two particular embodiments of the invention have been shown and described, it will be obvious to those skilled in the art that changes and modifications may be made without departing from the invention and, therefore, the aim in the appended claims is to cover all such changes and modifications as fall within the true spirit and scope of the invention.

I claim:

1. Appartus for protecting a circuit from electrical overload comprising:
   a gas-filled tube surge arrester with two electrodes, the first of which connects to the circuit to be protected and includes a post, and the second of which is connected to a ground, with said electrodes being separated by a gas-filled gap;
   a sealed double air-gap type backup mechanism for conducting overload currents from the first electrode of the gas tube to ground in the event the gas tube fails to conduct the overload currents to ground, comprising:
      a brazing ring; a cruciform torus-shaped electrically insulating ceramic member silk screened onto the flat surface of the said gas tube's first electrode, the upper surface of said ceramic member being metalized; and a grounded metal can or cap covering the ceramic dielectric and the top of the gas tube in such a manner as to create a sealed air gap between the outer walls of the ceramic member and the inner section of the can, and a sealed air gap between the outer surface of the post of the said gas tube's first electrode and the inner wall of the ceramic member, whereby, when installed, electric overload discharge may take place across either said air gap along said outer walls or inner wall of the ceramic member to the can to ground with a permanent short circuit formed from the protected line or equipment to ground.

2. Apparatus for protecting a circuit from electrical overload comprising:
   a gas-filled tube type surge arrester with two electrodes, the first of which connects to the circuit to be protected and includes a post, and the second of which is connected to a ground, with said electrodes being separated by a gas-filled gap;
   a sealed double air-gap type backup mechanism for conducting overload currents from the first electrode of the gas tube to ground in the event the gas tube fails to conduct the overload currents to ground, comprising:
      two brazing rings; a ceramic dielectric means defined as a torus-shaped ceramic member formed in a stairstep form with a partially metalized upper section and lower section, wherein the dielectric constant of the material comprising the said upper section is high, while the dielectric constant of the material comprising the said lower section is low, and wherein the said upper section defines a wall and said lower section is brazed to the top surface of the first electrode of the gas tube; and a grounded metal can or cap covering the ceramic dielectric and the top of the gas tube in such a manner as to create a sealed air gap of 0.003 inch between the outer section of the ceramic member and the inner section of the can, and a 0.006 inch sealed air gap between the surface of the post of the first electrode of the gas tube and the inner wall of the ceramic member, whereby, when installed, electric overload discharge may take place across either said air gap along said outer wall or inner wall of the ceramic dielectric to the can to ground, with a permanent short circuit formed from the protected line or equipment to ground.

* * * * *